United States Patent [19]

Takumi

[11] Patent Number: 4,602,366
[45] Date of Patent: Jul. 22, 1986

[54] SYSTEMS FOR CHANGING ADDRESSES OF TRANSMISSION APPARATUS

[75] Inventor: Kenta Takumi, Tokyo, Japan

[73] Assignee: NEC Corporation, Tokyo, Japan

[21] Appl. No.: 631,731

[22] Filed: Jul. 17, 1984

[30] Foreign Application Priority Data

Jul. 18, 1983 [JP] Japan .................................. 58-130672
Jul. 18, 1983 [JP] Japan .................................. 58-130673

[51] Int. Cl.⁴ ................................................ H04J 3/26
[52] U.S. Cl. ........................................ 370/94; 370/89; 370/85
[58] Field of Search ..................... 370/94, 92, 89, 95, 370/85

[56] References Cited

U.S. PATENT DOCUMENTS

| | | | |
|---|---|---|---|
| 3,787,627 | 1/1974 | Abramson et al. | 370/89 |
| 3,790,717 | 2/1974 | Abramson et al. | 370/89 |
| 4,168,400 | 9/1979 | deCouasnon et al. | 370/89 |
| 4,413,258 | 11/1983 | Quick et al. | 370/94 |

OTHER PUBLICATIONS

"Setting the Unique Device Address" of an article entitled Omninnet Network Installation Guide, Corvus Systems, 2029, O'Toole Avenue, San Jose, CA 95131, USA, Dec. 1982.

Primary Examiner—Douglas W. Olms
Attorney, Agent, or Firm—Schwartz, Jeffery, Schwaab, Mack, Blumenthal & Evans

[57] ABSTRACT

The address changing system comprises a common transmission line, a plurality of transmitting apparatus connected to the common transmission line, and transmitting means for transmitting a packet frame having destination address fields through the common transmission line from one to another transmitting apparatus. Each transmitting apparatus is provided with address changing means for changing its own address when supplied with a control instruction for another transmission apparatus, transmitting means for transmitting an address changing control instruction frame to another transmission apparatus through the common transmission line, and another transmitting means for transmitting to the another transmitting apparatus another control instruction packet frame showing that its own address has been changed.

6 Claims, 7 Drawing Figures

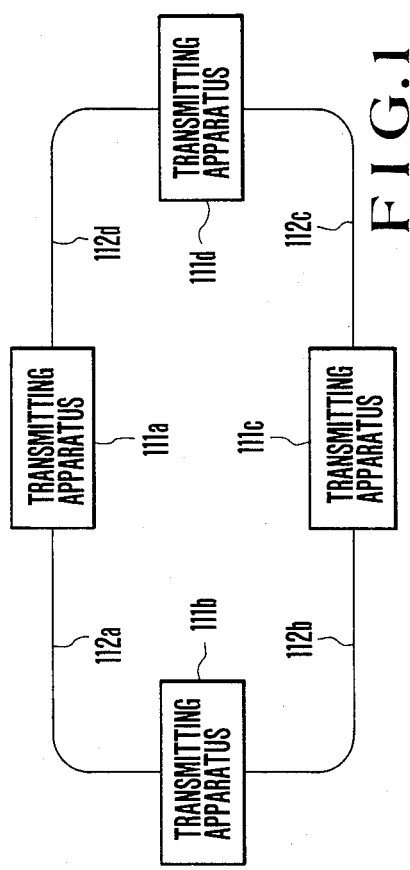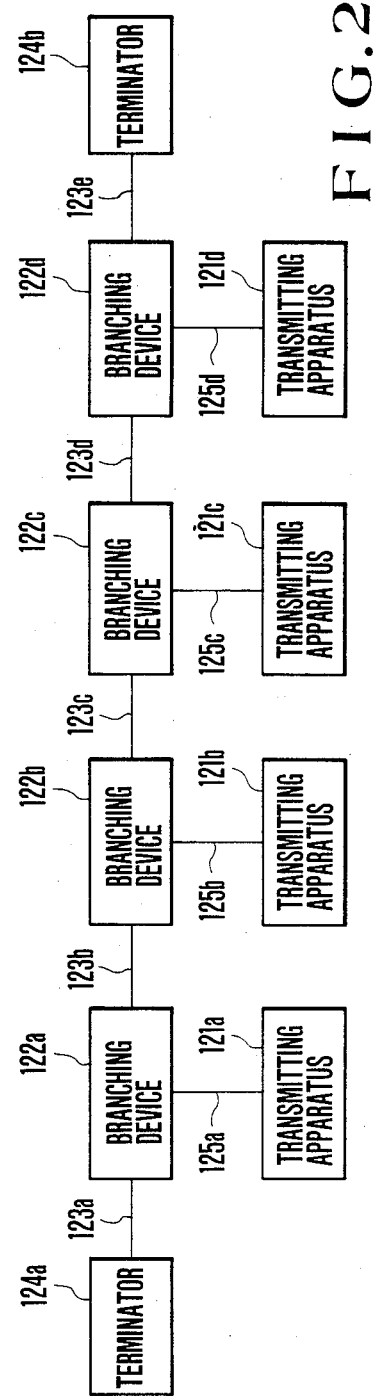

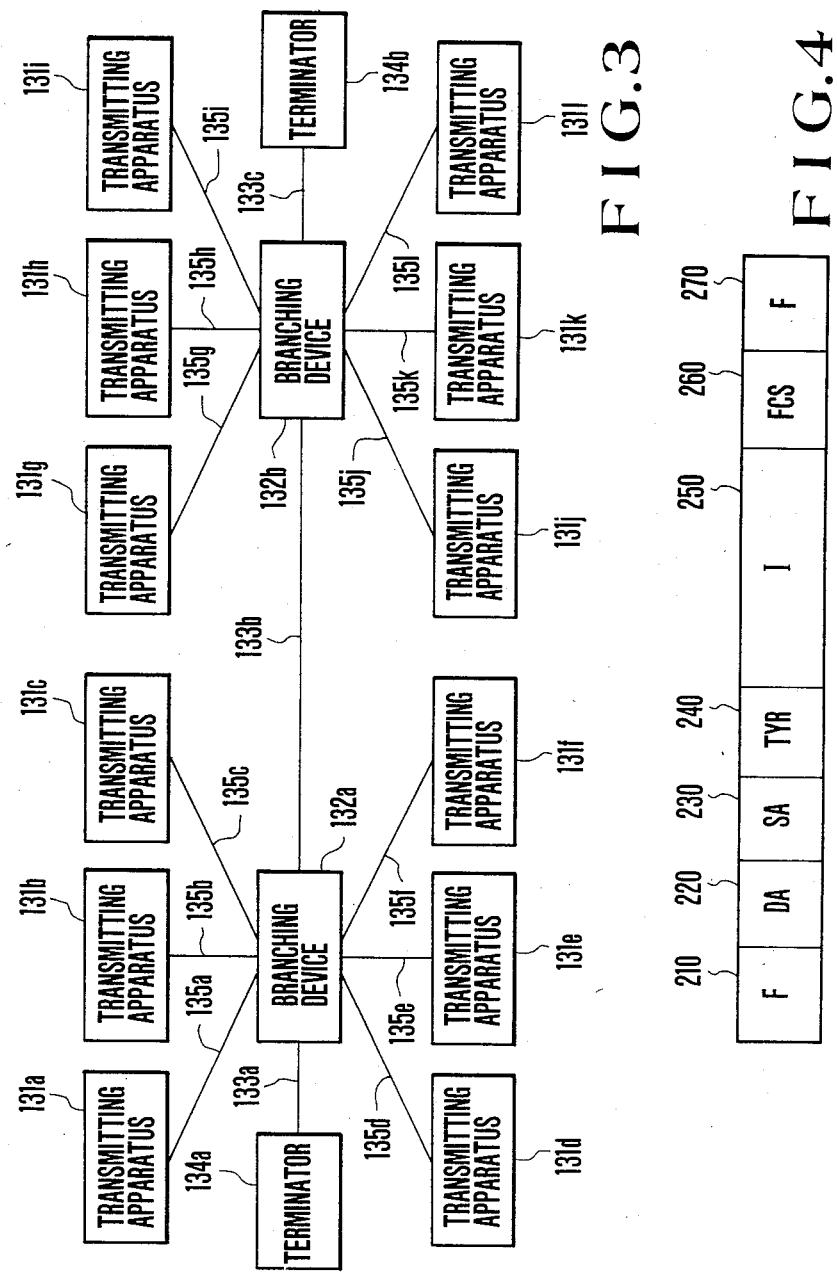

SYSTEMS FOR CHANGING ADDRESSES OF TRANSMISSION APPARATUS

BACKGROUND OF THE INVENTION

This invention relates to a system for changing the addresses of transmission apparatus wherein data of packet frames are transmitted among a plurality of tramsmission apparatus connected to a common transmission line.

The addresses of the transmission apparatus connected to a common transmission line are fixed at the time of installing the system due to switches or wirings so that it has been impossible to change the addresses during the operation of the system.

Conventionally, in order to set addresses of data communication apparatus connected to a commmon tramsmission line in a network, manual setting using a hardware such as a DIP switch has been employed as disclosed in chapter "Setting the Unique Device Address" of an article entitled "Omninnet Network Installation Guide", CORVUS SYSTEMS, 2029, O'Toole Avenue, San Jose, Calif. 95131, U.S.A., December, 1982. Accordingly, to set or change the addresses, it is necessary to disconnect the transmission apparatus from the transmission line so that it is impossible to utilize the transmission line while the transmitting apparatus is being disconnected therefrom and an operator must go to the field of installation of such transmission apparatus requiring change of its addresses.

SUMMARY OF THE INVENTION

It is, therefore, an object of this invention to provide a novel system for changing the addresses capable of quickly changing addresses of a given transmission apparatus whithout disconnecting the same from the common transmission line so that the operator is not required to go to a remote place at which the given transmission apparatus is installled.

According to this invention, there is provided a transmission apparatus address changing system comprising a common transmission line, a pluralitdy of transmitting apparatus connected to the common transmission line and having each a specified address, and means for transmitting a packet frame having a destination address field through the common transmission line from one to other transmitting apparatus, each transmitting appratus being provided with means for changing its own address when supplied with a control instruction from another transmitting apparatus, means for transmitting an address changing control instruction frame to another transmission apparatus through the common transmission line, and means for transmitting to the another transmitting apparatus another control instruction packet frame showing that the own address has been changed.

BRIEF DESCRIPTION OF THE DRAWINGS

In the accompanying drawings;

FIGS. 1, 2 and 3 are block diagrams showing different connections of a transmission line system to which the invention is applicable;

FIG. 4 shows a format of a packet frame to be transmitted;

DESCRIPTION OF THE PREFERRED EMBODIMENT

Figure 5:
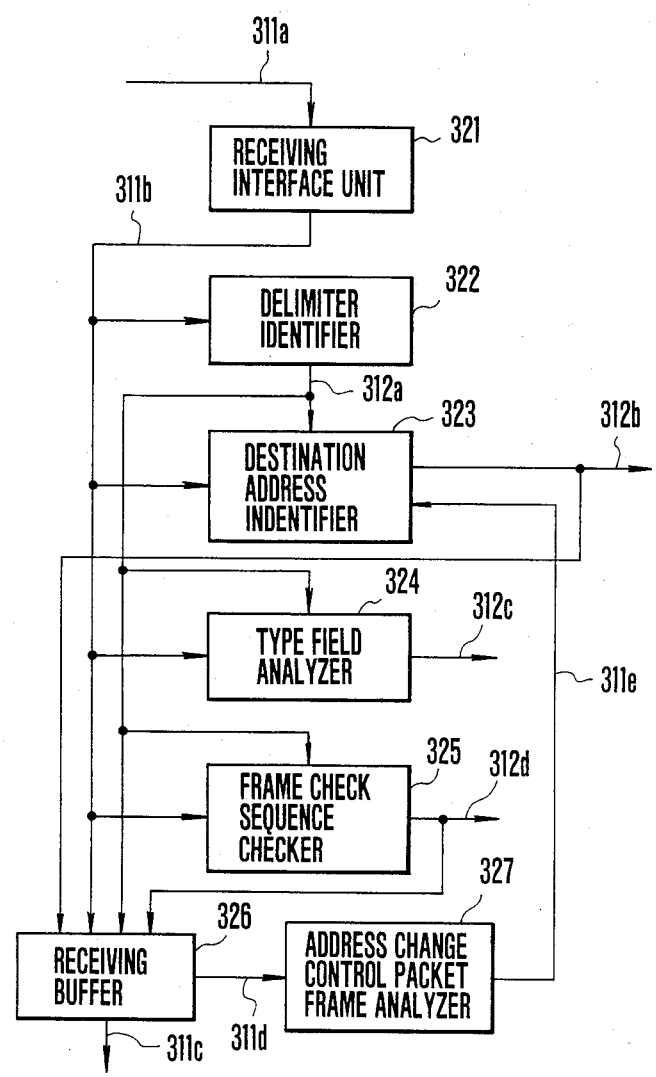
FIG. 5 is a block diagram showing parts effecting address change processing of a transmission apparatus.

The principle and operation of this invention will first be described. More particularly, an address changing control instruction packet frame is sent to a transmission apparatus of an office whose address is required to be changed from the transmitting apparatus of any another office. Respective transmitting apparatus are provided with means for electrically changing the addresses thereof so that these apparatus change their own addreses when they receive the control instruction packet frame. The result of address change is communicated, through another control instruction packet frame, to the transmitting apparatus of another office from the transmitting apparatus of an office which has issued the addresse change instruction.

In this manner, it is possible to change quickly by remote operation the address of any one of transmitting apparatus connected to a common transmission line without disconnecting the transmission apparatus from the transmission line and without the necessity of dispatching an operator to a field of installation of the transmitting apparatus whose address is required to be changed, and to quickly communicate the result of change to another transmission apparatus. In other words, adddress change can be effected without interferring with the normal operatin of the system.

FIG. 1 is an example comprising a loop transmission line or path. As shown, transmitting apparatus (strictly speaking, transceivers) 111a to 111d are interconnected by sections 112a to 112d which are connected in a loop.

FIG. 2 shows an example of a branching transmisson line in which transmitting apparatus 121a to 121d are connected to sections 123a to 123e which are connected in the form of a bus line via branching devices 122a to 122d, and branching lines 125a to 125d. The transmission line is terminated with terminal divices 124a and 124b.

FIG. 3 is an example comprising an optical fiber transmission line and transmission apparatus, branching from the transmission line by using star couplers. More particularly, 131a to 131i represent transmitting apparatus, 132a and 132b represent branching devices, for example, star couplers, 133a to 133c constitute a bus line transmission line, 134a and 134b show terminators, and 135a to 135i represent branching lines extending from branching devices 132a and 132b.

The modes of transmission shown in FIGS. 1, 2 and 3 are the same in that a plurality of transmission apparatus commonly utilize the same transmission line. As will be described later, since the invention is not limited to any specific mode of the transmission line, the invention is applicable to any one of the modes described above.

FIG. 4 shows a format of a packet frame transmitted through the transmission line in the transmission system embodying the invention. The packet frame shown in FIG. 4 comprises a start delimiter 210 identifying the begining of the frame, a destination address field 220 showing the address of a transmission apparatus to which the packet frame is destined, an origination address field 230 showing the address of a transmitting apparatus which has sent out the packet frame, a type field 240 showing the type or performance of the packet frame, and an information field 250 for insertion of information to be transmitted. In a packet frame adapted to transmit control information, this information field 250 may be omitted so as to insert the control information into the type field 240. In a broadcast communication, the fact that its packet frame is a broadcast communication is usually identified by the destination adress field 220. Although identificaion of the broadcast communication may be made by the type field 240, such identification can be made in priciple in any field. The packet frame shown in FIG. 4 further comprises a frame check sequence 260 which is used to detect errors of indispensable fields 220 to 250 of the packet frame, and an end delimiter 270 adapted to identify the end of the packet frame.

Respective transmitting apparatus which mutually interchange information by usig a packet frame described above and utilize a common transmission line are provided with means for changing their own addresses.

FIG. 5 shows circuit elements utilized to change the addresses. The circuit shown in FIG. 5 comprises data lines 311a to 311e and signal lines 312a to 312d. Particularly, 311a represents a data line receiving a signal received from the common transmission line and the received signal is sent to various circuit elements through a receiving interface unit 321 and data line 311b. The circuit further comprises a delimiter identifier 322 that identifies the start delimiter 210 and the end delimiter 270 of the packet frame shown in FIG. 4 and a delimiter identifying signal is transmitted to various parts via signal line 312a. There is also provided a destination address identifier that identifies the destination address frame 220 a predetermined time after receipt of the delimiter identifying signal via signal line 312a. The address identifier 323 compares the address of a transmitting apparatus of its own with a destination address sent over data line 311b. When it is found that the packet frame is destined to the transmisson apparatus of its own, the recieved packet frame signal is sent to various parts via signal line 312b. A type field analyzer 324 is provided to analyze the type field 240 transmitted over data line 311b a predetermined time after receipt of the delimiter identifying signal over signal line 312a and the result of analysis is transmitted to various parts through signal line 312c. Reference numeral 325 represents a frame checks sequence checker which ckecks the frame check sequence 260 transmitted over data line 311b a predetermined time after receipt of the delimiter identifying signal on line 312a. When an error is detected as a result of the check, the detected error is sent to various parts over signal line 312d. Reference numeral 326 represents a receiving buffer which holds a packet frame received from the data line 311b when the received packet frame signal is transmitted over signal line 312b a predetermined time after receipt of the delimiter identifying signal over signal line 312a and then transmits the received packet frame to various parts over data line 311c. However, when a frame check error is transmitted via signal line 312d, the receiving buffer invalidates the content held therein. An address change control packet frame analyzer 327 is connected to the output of the receiving buffer 326 for detecting and analyzing the fact that the packet frame held in the receiving buffer 326 is the control packet frame that designates change of the address of the transmitting apparatus of its own. The address change designating packet frame is constructed such that the address change designation is shown by the type field 240 shown in FIG. 4 and that a new address to be changed is shown by the informatin field 250. Consequently, the address change control packet frame analyzer 327 obtains a received packet frame from the receiving buffer 326 through data line 311d for checking the type field 240, whereas when an address change is designated, a new address is obtained out from the information field 250 for sending an address change designation and a new address to the destination address identifier 323 via data line 311e.

Figure 6:
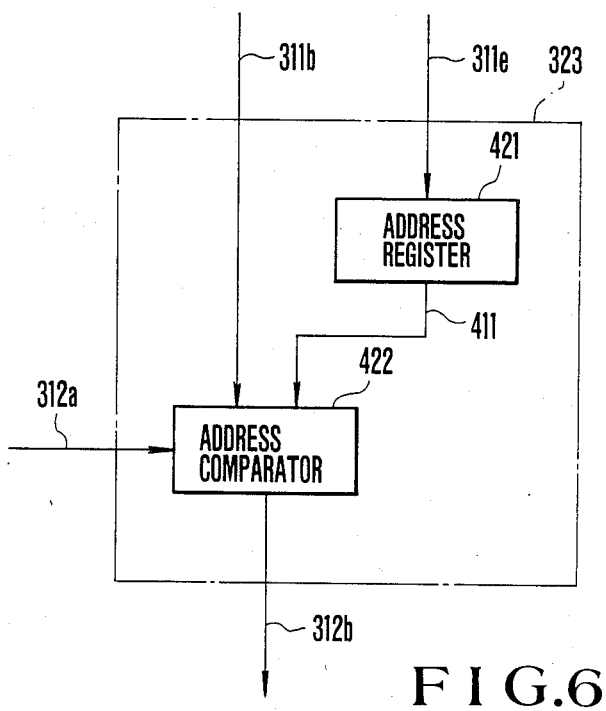
FIG. 6 is a block diagram showing details of the destination address identified shown in FIG. 5.

FIG. 6 is a block diagram showing details of the destination address identifier 323. As shown, the identifier 323 comprises a data line 411, an address register 421 showing the address of a transmitting apparatus of its own and an address comparator 422 which compares the destination address of a received packet frame sent over a data line 311b with the address of the transmitting apparatus of its own taken in through data line 411 and held in the address register 421 a predetermined time after receipt of the delimiter identification signal via signal line 312a. The address register 421, on the other hand, rewrites its stored content to a new address received simultaneously with the supply of an address change instruction over data line 311e.

As described above, the address of a transmitting apparatus of an office designated by an address change control packet frame sent from any other transmitting apparatus connected to the common transmission line can be changed by the address change control packet frame.

After the address change, the communication between a given transmitting apparatus and another transmitting apparatus can not be made correctly, unless the change of the address of the given transmitting apparatus is promptly communicated to another transmitting apparatus. For this reason, a transmitting apparatus which has sent a control packet frame designating an address change to another transmitting apparatus required to change its address communicates this fact to another transmitting apparatus connected to the common transmitting line by using another control packet frame. This communication control packet frame may be individually sent to respective transmitting apparatus or may be transmitted through broadcast communication. In any case, the control packet takes the format shown in FIG. 4.

As described above, according to this invention, respective transmission apparatus are provided with means for changing their addresses when supplied with a control instruction from another transmitting apparatus so as to send an address changing control instruction packet frame to a transmitting apparatus whose address is required to be changed. Furthermore, another control instruction packet frame is sent to another transmitting apparatus for informing it of the change to ensure that the change of the address of any transmitting apparatus can be effected at a high speed from a remote place.

Figure 7:
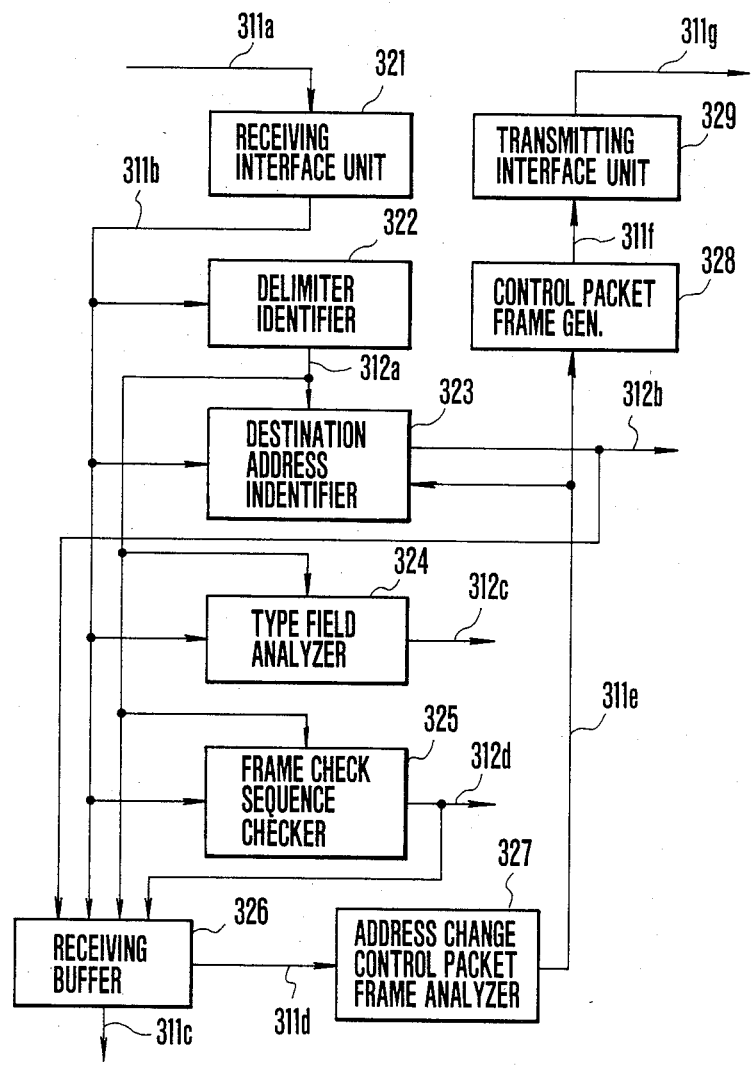
FIG. 7 is a block diagram showing a modification of parts effecting address change processing of a transmission apparatus.

In a modificaiton shown in FIG. 7, circuit elements identical to those shown in FIG. 5 are designated by the same reference numerals. In this modification, there is added a control packet frame generator 328 generating a control packet frame adapted to communicate to other transmitting apparatus the result of changing the address of a given transmission apparatus. More particularly, when an address change designation signal is issued on a data line 311e from the address change control packet frame analyzer 327, this address change designation signal is applied to the destination address identifier 323 and to the control packet frame generator 328 so as to form a corresponding control packet frame. The control packet frame thus formed is sent to the common transmission line via data lines 311f and 311g and a transmitting interface unit 329. The control packet frame generator 328 may be dedicated to generate only the control packet frame but may have performance capabilities of a processor executing other controls.

I claim:

1. A transmission apparatus address changing system comprising:

a common transmission line;

a plurality of transmitting apparatus connected to said common transmission line and each having a specified address; and means for transmitting a packet frame having a destination address field through said common transmission line from one to another transmitting apparatus;

each transmitting apparatus being provided with means for changing its own address when supplied with a control instruction from another transmitting apparatus, said means for changing its own address comprises a receiving interface unit connected to said transmission line, a delimiter identifier supplied with an output of said receiving interface unit for identifying start delimiter and an end delimiter of said packet frame for producing a delimiter identification signal, a destination address identifier for identifying a destination address frame of said packet frame a predetermined time after receipt of said delimiter identification signal, a type field analyzer supplied with the output of said receiving interface unit for analyzing a type field of said packet frame a predetermined time after receipt of said delimiter identification signal, a frame check sequence checker supplied with a frame check sequence of said packet frame from said receiving interface unit for detecting error a predetermined time after receipt of said delimiter identification signal from said delimiter identifier, a receiving buffer supplied with outputs of said receiving interface unit, said destination address identifier, said delimiter identifier and said frame check sequence checker, and and address change control packet frame analyzer responsive to an output of said receiving buffer for applying an output to said destination address identifier;

means for transmitting an address changing control instruction frame to another transmission apparatus through said common transmission line, and means for transmitting to said another transmitting apparatus another control instruction packet frame showing that its own address has been changed.

2. The transmission apparatus address changing system according to claim 1 wherein said common transmission line comprises a closed loop in which said plurality of transmission apparatus are connected in series.

3. The transmission apparatus address changing system according to claim 1 wherein said common transmission line comprises a bus line with both ends terminated with terminators and said plurality of transmission apparatus are connected to said bus line through branching devices.

4. The transmission apparatus address changing system according to claim 3 wherein said bus line comprises an optical fiber transmission line and said branching devices comprise star couplers.

5. The transmission apparatus address changing apparatus according to claim 1 wherein said destination address identifier comprises an address register for storing an address of a given transmitting apparatus and an address comparator comparing a destination address of a received packet frame with the address of said given transmitting apparatus stored in said address register a predetermined time after receipt of said delimiter identification signal from said delimiter identifier.

6. The transmission apparatus address changing apparatus according to claim 5 which further comprises a control packet frame generator supplied with the output of said address change control packet frame analyzer, and a transmitting interface unit which sends a control packet frame generated by said control packet frame generator to said transmission line.

* * * * *